US008023077B2

(12) United States Patent
Iijima

(10) Patent No.: US 8,023,077 B2
(45) Date of Patent: Sep. 20, 2011

(54) LIQUID CRYSTAL APPARATUS, COLOR FILTER SUBSTRATE, AND ELECTRONIC APPARATUS

(75) Inventor: Chiyoaki Iijima, Ina (JP)

(73) Assignee: Sony Corporation, Tokyo (JP)

(*) Notice: Subject to any disclaimer, the term of this patent is extended or adjusted under 35 U.S.C. 154(b) by 952 days.

(21) Appl. No.: 11/953,251

(22) Filed: Dec. 10, 2007

(65) Prior Publication Data

US 2008/0231777 A1 Sep. 25, 2008

(30) Foreign Application Priority Data

Mar. 19, 2007 (JP) ................................ 2007-070212

(51) Int. Cl.
*G02F 1/1335* (2006.01)

(52) U.S. Cl. ....................................... 349/114; 349/106

(58) Field of Classification Search ........................ None
See application file for complete search history.

(56) References Cited

U.S. PATENT DOCUMENTS

2005/0270449 A1* 12/2005 Koma et al. .................. 349/114
2006/0103794 A1* 5/2006 Iijima et al. .................. 349/114

FOREIGN PATENT DOCUMENTS

| | | |
|---|---|---|
| JP | 2002-228824 | 8/2002 |
| JP | 2003-255324 | 9/2003 |
| JP | 2006-003393 | 1/2006 |
| JP | 2007-052369 | 3/2007 |

* cited by examiner

*Primary Examiner* — Lucy P Chien
(74) *Attorney, Agent, or Firm* — K&L Gates LLP

(57) ABSTRACT

A liquid crystal apparatus includes a pair of substrates. The pair of substrates includes a liquid crystal layer disposed therebetween, and a two-dimensional array of pixel regions each including a transmissive display region and a reflective display region, the transmissive display regions of different pixel regions having areas different from one another. One of the substrates has a plurality of color filter layers provided in correspondence with the pixel regions, a reflective film provided over the color filter layers, and an overcoat film covering the reflective film. Among the pixel regions including the transmissive display regions having different areas, a pixel region including a transmissive display region with a large area has a color filter layer with a thickness larger than that of a color filter layer provided in a pixel region including a transmissive display region with a small area.

7 Claims, 3 Drawing Sheets

S 1 R R T
15 42 12 13 11 27 41 14 16
31 32 33 26 25 24 23 22 21
23R 23G 23B
22R 22G 22B

LIQUID CRYSTAL APPARATUS, COLOR FILTER SUBSTRATE, AND ELECTRONIC APPARATUS

The entire disclosure of Japanese Patent Application No. 2007-070212, filed Mar. 19, 2007 is expressly incorporated by reference herein.

BACKGROUND

1. Technical Field

The present invention relates to liquid crystal apparatuses, color filter substrates, and electronic apparatuses.

2. Related Art

Transflective liquid crystal apparatuses employing both the reflective display mode and the transmissive display mode have been used as display apparatuses for mobile phones and the like. In a known example of such transflective liquid crystal apparatuses, a reflective metal film made of aluminum or the like having openings therein is provided as a transflective film on the inner surface of a lower substrate. JP-A-2006-3393 discloses another example, a so-called mono/color transflective liquid crystal apparatus, in which the reflective display mode is for black-and-white display and the transmissive display mode is for color display.

The liquid crystal apparatus disclosed in JP-A-2006-3393 includes a reflective film covering a color filter layer provided on a lower substrate. Further the area of openings provided in the reflective film is changed with colors to be displayed in individual pixel regions, whereby the luminances of the individual pixel regions in the transmissive display mode are made uniform. Additionally, an overcoat film is provided on the reflective film so as to obtain a flat surface.

However, there is still a problem with such known liquid crystal apparatuses. Since the openings provided in regions corresponding to pixel regions have different areas, the overcoat film may be formed with different thicknesses at regions above the openings in accordance with the areas of the openings. Further, conforming to the difference in surface levels of the overcoat film, the liquid crystal layer may also have different thicknesses at regions above the openings provided correspondingly to pixel regions. Consequently, the liquid crystal layer may have various amounts of retardation in the transmissive display mode. This may color the black or white display regions in the transmissive display mode, thereby degrading contrast.

SUMMARY

An advantage of some aspects of the invention is that it provides a liquid crystal apparatus capable of reducing variations in the amounts of retardation in a liquid crystal layer in the transmissive display mode and thereby realizing high-quality image display, a color filter substrate used in the liquid crystal apparatus, and an electronic apparatus using the liquid crystal apparatus.

According to a first aspect of the invention, a liquid crystal apparatus includes a pair of substrates. The pair of substrates includes a liquid crystal layer disposed therebetween, and a two-dimensional array of pixel regions each including a transmissive display region and a reflective display region, the transmissive display regions of different pixel regions having areas different from one another. One of the substrates has a plurality of color filter layers provided in correspondence with the pixel regions, a reflective film provided over the color filter layers, and an overcoat film covering the reflective film. Among the pixel regions including the transmissive display regions having different areas, a pixel region including a transmissive display region with a large area has a color filter layer with a thickness larger than that of a color filter layer provided in a pixel region including a transmissive display region with a small area.

In the first aspect of the invention, a pixel region including a transmissive display region with a large area has a color filter layer thicker than that provided in a pixel region including a transmissive display region with a small area, whereby variations in regional thicknesses of the liquid crystal layer due to the variations in the areas of the transmissive display regions can be reduced. Thus, variations in the amounts of retardation in a liquid crystal layer in the transmissive display mode can also be reduced among the pixel regions including the transmissive display regions of different areas. That is, the larger the areas that the transmissive display regions have, the smaller the thicknesses that the corresponding portions of the overcoat film have. Therefore, differences in the total thicknesses of portions of the overcoat film and the individual color filter layers can be reduced by sequentially increasing the thicknesses of the color filter layers in accordance with the increases in the areas of the transmissive display regions. Accordingly, the variations in regional thicknesses of the liquid crystal layer in the individual transmissive display regions are reduced, and thus the amounts of retardation in the liquid crystal layer can be made uniform. In this manner, coloring of the black or white display regions in the transmissive display mode can be suppressed, thereby improving contrast and realizing high-quality image display.

According to a second aspect of the invention, a liquid crystal apparatus includes a pair of substrates. The pair of substrates includes a liquid crystal layer disposed therebetween, and a two-dimensional array of pixel regions each including a transmissive display region having a rectangular shape in plan view and a reflective display region, the rectangular transmissive display regions of different pixel regions having short-side lengths different from one another. One of the substrates has a plurality of color filter layers provided in correspondence with the pixel regions, a reflective film provided over the color filter layers, and an overcoat film covering the reflective film. Among the pixel regions including the rectangular transmissive display regions having different short-side lengths, a pixel region including a transmissive display region having a large short-side length has a color filter layer with a thickness larger than that of a color filter layer provided in a pixel region including a transmissive display region having a small short-side length.

In the second aspect of the invention, a pixel region including a transmissive display region having a large short-side length has a color filter layer thicker than that provided in a pixel region including a transmissive display region having a small short-side length, whereby variations in regional thicknesses of the liquid crystal layer due to the variations in the shorter-side lengths of the transmissive display regions can be reduced. Consequently, as in the case of the first aspect, variations in the amounts of retardation in a liquid crystal layer in the transmissive display mode can also be reduced, and high-quality image display can be realized.

It is preferable that the transmissive display regions be defined by openings provided in the reflective film.

In this case, transmissive display regions are defined by providing the reflective film with openings through which light enters the color filter layers thereby realizing transmissive display.

It is preferable that, when the area of the transmissive display region having a large area is 1.25 or more times larger than the area of the transmissive display region having a small area, the thickness of the color filter layer provided in the pixel region including the transmissive display region having a large area be 1.05 or more times the thickness of the color filter layer provided in the pixel region including the transmissive display region having a small area.

In this case, when the area of the transmissive display region having a large area in one of two pixel regions is 1.25 or more times larger than that of the transmissive display region in the other pixel region, the thickness of the color filter layer in the one pixel region is 1.05 or more times that of the color filter layer in the other pixel region. In this manner, the total thicknesses of the individual color filter layers and the corresponding portions of the overcoat film can be more assuredly made uniform between the two pixel regions.

It is preferable that the color filter layers be provided with light-shielding layers extending along outer peripheries of the pixel regions, and that the reflective film include slits provided therein along outer peripheries of the pixel regions.

In this case, in the reflective display mode, light traveling through the liquid crystal layer toward the outer peripheries of the pixel regions further travels through the slits and is absorbed by the light-shielding layers. This improves the contrast in the reflective display mode, and thus high-quality image display can be realized.

It is preferable that the light-shielding layers overlap inner peripheries of the pixel regions.

In this case, the light-shielding layers are provided so as to overlap inner peripheries of the pixel regions. This improves the flatness in the reflective display regions in the individual pixel regions, and therefore variations in the regional thicknesses of the liquid crystal layer can be reduced. Accordingly, variations in the amounts of retardation in the liquid crystal layer can also be reduced, and thus high-quality image display can be realized.

Also in this case, it is more preferable that the light-shielding layer be provided almost over the entirety of the area below the bottom surface of the reflective film. In this manner, the flatness in the reflective display regions of the individual pixel regions can be more assuredly improved. Thus, the display quality in the reflective display mode is further improved.

According to a third aspect of the invention, a color filter substrate includes a substrate body, a plurality of color filter layers provided on the substrate body, a reflective film provided over the color filter layers, and an overcoat film covering the reflective film. The color filter substrate has a two-dimensional array of unit regions each including a reflective display region where the reflective film exists and a transmissive display region where the reflective film does not exist, the transmissive display regions having different areas from one another. Among the unit regions including the transmissive display regions having different areas, a unit region including a transmissive display region with a large area has a color filter layer with a thickness larger than that of a color filter layer provided in a unit region including a transmissive display region with a small area.

According to a fourth aspect of the invention, a color filter substrate includes a substrate body, a plurality of color filter layers provided on the substrate body, a reflective film provided over the color filter layers, and an overcoat film covering the reflective film. The color filter substrate has a two-dimensional array of unit regions each including a reflective display region where the reflective film exists and a transmissive display region where the reflective film does not exist, the transmissive display regions having rectangular shapes in plan view with short-side lengths different from one another in different unit regions. Among the unit regions including the rectangular transmissive display regions having different short-side lengths, a unit region including a transmissive display region having a large short-side length has a color filter layer with a thickness larger than that of a color filter layer provided in a unit region including a transmissive display region having a small short-side length.

In a liquid crystal apparatus including either of the color filter substrates according to the third and fourth aspects of the invention, variations in the amounts of retardation in the liquid crystal layer in the transmissive display mode can be reduced, and thus high-quality image display can be realized, as in other aspects of the invention.

According to a fifth aspect of the invention, an electronic apparatus includes the liquid crystal apparatus according to the first aspect of the invention.

In the fifth aspect of the invention, high-quality image display can be realized in the transmissive display mode, as in other aspects of the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1A:
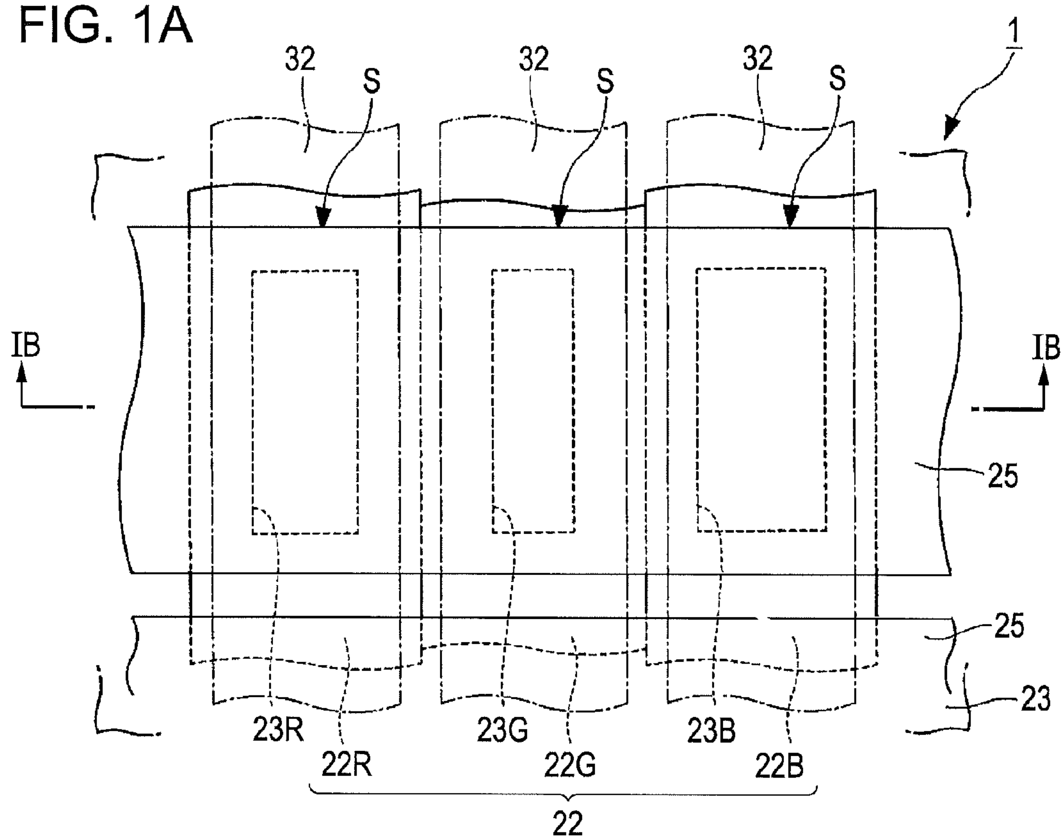
FIG. 1A is a plan view showing a pixel of a liquid crystal apparatus according to a first embodiment of the invention.
Figure 1B:
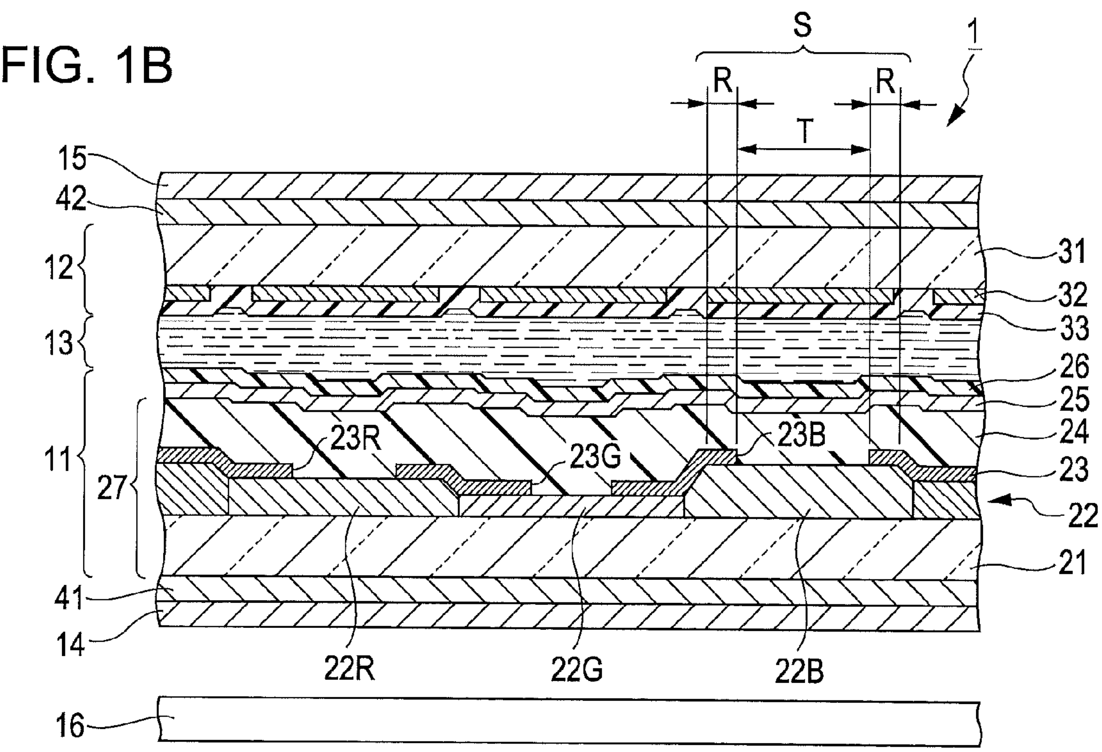
FIG. 1B is a cross-sectional view showing the pixel of the liquid crystal apparatus according to the first embodiment of the invention.

A liquid crystal apparatus and a color filter substrate according to a first embodiment of the invention will now be described with reference to the drawings, in which the scales of components are changed appropriately for easier recognition. FIGS. 1A and 1B show a pixel of the liquid crystal apparatus in a plan view and in a cross-sectional view taken along line IB-IB in FIG. 1A, respectively. However, an upper substrate is not shown in FIG. 1A.

Liquid Crystal Apparatus

A liquid crystal apparatus 1 according to the first embodiment is a color liquid crystal apparatus of the passive-matrix type. In the liquid crystal apparatus 1, a single pixel includes three sub-pixel regions S that emit red (R), green (G), and blue (B) light, respectively. Herein, a display region constituting the smallest display unit is referred to as a “sub-pixel region”.

Referring to FIG. 1B, the liquid crystal apparatus 1 includes a lower substrate (one of two substrates) 11, an upper substrate (the other substrate) 12, a liquid crystal layer 13 disposed between the lower substrate 11 and the upper substrate 12, a polarizing plate 14 provided on the outer surface (the surface remote from the liquid crystal layer 13) of the lower substrate 11, and a polarizing plate 15 provided on the outer surface of the upper substrate 12. The liquid crystal apparatus 1 also includes an illumination device 16, provided on the outer side of the lower substrate 11, that emits illuminating light.

The liquid crystal apparatus 1 further includes a sealant (not shown) disposed along the periphery of a space between the lower substrate 11 and the upper substrate 12. The sealant, the lower substrate 11, and the upper substrate 12 in combination enclose the liquid crystal layer 13.

The lower substrate 11 includes a substrate body 21 made of a light-transmissive material such as glass, quartz, or plastic. The lower substrate 11 further includes a color filter layer 22, a reflective film 23, an overcoat film 24, common electrodes (first electrodes) 25, and an alignment film 26 stacked in sequence on the inner surface (the surface near the liquid crystal layer 13) of the substrate body 21.

As shown in FIGS. 1A and 1B, the color filter layer 22, which is made of a resin material such as a photosensitive acrylic resin, includes three kinds of colored layers 22R, 22G, and 22B provided in the corresponding sub-pixel regions S that emit light of three colors R, G, and B, respectively.

The colored layers 22R, 22G, and 22B are arrayed on the substrate body 21 in a stripe pattern with almost no gaps therebetween so as to correspond to the array of the sub-pixel regions S. The thicknesses of the colored layers 22R, 22G, and 22B are designed in accordance with the areas of openings 23R, 23G, and 23B, respectively, to be described below, provided in the reflective film 23 in the corresponding sub-pixel regions S. Specifically, the thicknesses of the colored layers 22G, 22R, and 22B increase sequentially in that order, whereas the areas and shorter-side lengths of the openings 23B, 23R, and 23G decrease (become shorter) sequentially in that order. In other words, the larger the area and the larger the shorter-side length that the openings 23R, 23G, and 23B have, the larger the thickness that the colored layers 22R, 22G, and 22B have.

The color filter layer 22 is formed by applying a resin material for forming, for example, the colored layer 22G on the substrate body 21, patterning the resin material by photolithography or the like to form the colored layer 22G, and then repeating similar processes for the colored layers 22R and 22B.

The reflective film 23 is made of a metal material, such as aluminum or silver, having a high reflectance. The reflective film 23 has openings 23R, 23G, and 23B of substantially rectangular shapes in plan view (in a direction in which the lower substrate 11 and the upper substrate 12 are stacked) at positions in the corresponding sub-pixel regions S. That is, the reflective film 23 partially overlaps the colored layers 22R, 22G, and 22B in plan view. Referring to FIG. 1B, in each of the sub-pixel regions S, the reflective film 23 defines a transmissive display region T at each of the openings 23R, 23G, and 23B, and serves as a reflective display region R at the solid portion.

Referring to FIG. 1A, the longer-side lengths of the openings 23R, 23G, and 23B are substantially the same, whereas the shorter-side lengths decrease sequentially for the openings 23B, 23R, and 23G in that order. That is, the areas of the openings 23B, 23R, and 23G decrease sequentially in that order. Accordingly, the areas of the transmissive display regions T also decrease sequentially for the regions corresponding to B, R, and G in that order.

The area of the opening 23R is 1.25 or more times that of the opening 23G, while the thickness of the colored layer 22R is 1.05 or more times that of the colored layer 22G. Likewise, the area of the opening 23B is 1.25 or more times that of the opening 23G, while the thickness of the colored layer 22B is 1.05 or more times that of the colored layer 22G.

Referring to FIG. 1B, the overcoat film 24 is made of a resin material, such as acrylic resin, and covers the reflective film 23 and portions of the color filter layer 22 exposed through the openings 23R, 23G, and 23B. Therefore, the thickness of the overcoat film 24 at the sub-pixel regions S increases sequentially for the regions corresponding to B, R, and G in that order. The total thickness of the overcoat film 24 and the color filter layer 22 is substantially uniform at the individual transmissive display regions T in the sub-pixel regions S.

The overcoat film 24 is formed by applying a resin material for forming the overcoat film 24 on the reflective film 23 by spin coating or the like.

The substrate body 21, the color filter layer 22, the reflective film 23, and the overcoat film 24 constitute a color filter substrate 27.

The common electrodes 25 shown in FIGS. 1A and 1B are made of a light-transmissive conductive material such as indium tin oxide (ITO), and are arrayed in a stripe pattern with intervals thereamong to be isolated from one another, as shown in FIG. 1A. The common electrodes 25 extend in a transverse direction of the array of the three sub-pixel regions S constituting a single pixel. The common electrodes 25 are supplied with an image signal from a unit provided outside the liquid crystal apparatus 1.

Referring to FIG. 1B, the alignment film 26, which is made of a resin material such as polyimide, has its surface subjected to an orientation treatment for regulating the initial orientation of liquid crystal molecules included in the liquid crystal layer 13.

The upper substrate 12 includes a substrate body 31 made of a light-transmissive material such as glass, quartz, or plastic. The upper substrate 12 further includes segment electrodes (second electrodes) 32 and an alignment film 33 stacked in that order on the inner surface of the substrate body 31.

As in the case of the common electrodes 25, the segment electrodes 32 are made of a light-transmissive conductive material such as ITO. Referring to FIG. 1A, the segment electrodes 32 are arrayed in a stripe pattern with intervals thereamong to be isolated from one another. In plan view, the segment electrodes 32 extend in a direction orthogonal to the direction in which the common electrodes 25 extend. The intersections of the common electrodes 25 and the segment electrodes 32 form the individual sub-pixel regions S. The segment electrodes 32 are supplied with a scanning signal from a unit provided outside the liquid crystal apparatus 1, as in the case of the common electrodes 25, through wiring (not shown) provided on the lower substrate 11. When a voltage is applied between the common electrodes 25 and the segment electrodes 32 in accordance with the image signal and scanning signal supplied, an electric field is generated in the liquid crystal layer 13 at regions corresponding to the sub-pixel regions S to which the voltage has been applied. In this manner, the liquid crystal apparatus 1 switches the on/off state of the individual sub-pixel regions S.

Referring to FIG. 1B, the alignment film 33, which is made of a resin material such as polyimide, has its surface subjected to an orientation treatment, as in the case of the alignment film 26.

The liquid crystal layer 13 includes liquid crystal molecules in the super-twisted nematic (STN) mode, for example, having a twist angle of 240 degrees.

On the inner surfaces of the polarizing plate 14 and the polarizing plate 15, a quarter-wavelength plate 41 and a retardation plate 42 are provided, respectively.

When the liquid crystal apparatus 1 is in the reflective display mode, ambient light incident through the upper substrate 12 travels through the liquid crystal layer 13, is reflected by the reflective film 23, again travels through the liquid crystal layer 13 and the upper substrate 12, and is viewed from outside. In this case, since the ambient light does not enter the color filter layer 22, images are displayed in black and white.

In contrast, when the liquid crystal apparatus 1 is in the transmissive display mode, illuminating light of the illumination device 16 incident through the lower substrate 11 travels through the color filter layer 22, enters the liquid crystal layer 13 through the openings 23R, 23G, and 23B in the reflective film 23, travels through the upper substrate 12, and is viewed from outside. In this case, since the illuminating light travels through the color filter layer 22, images are displayed in color.

Electronic Apparatus

Figure 2:
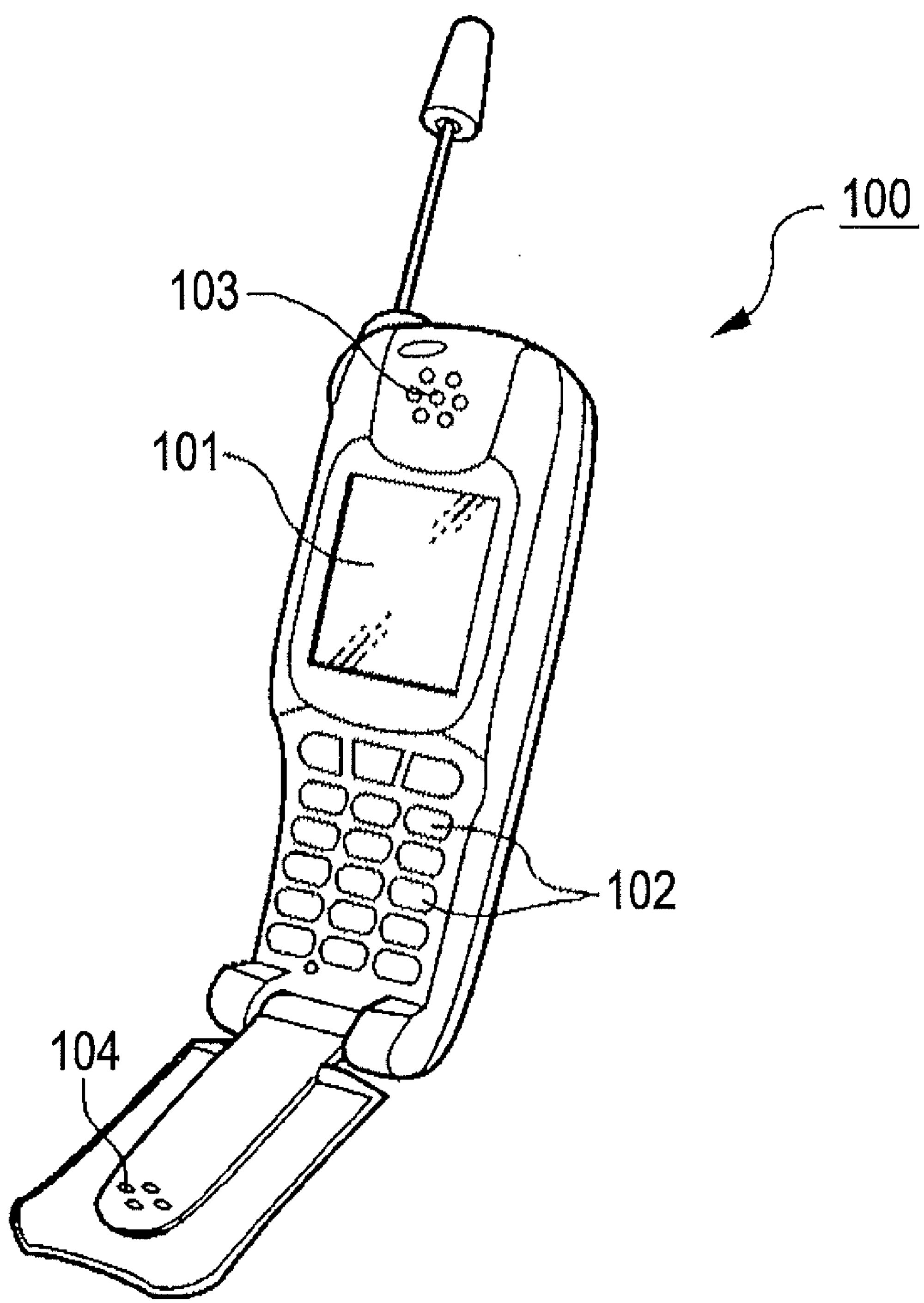
FIG. 2 is an external perspective view showing a mobile phone according to the first embodiment of the invention.

The liquid crystal apparatus 1 configured as described above is used as a display unit 101 of a mobile phone 100 shown in FIG. 2, for example. The mobile phone 100 has a main body including a plurality of operation buttons 102, an earpiece 103, a mouthpiece 104, and the display unit 101.

In the liquid crystal apparatus 1, the color filter substrate 27, and the mobile phone 100 of the first embodiment, the color filter layer 22 is formed such that the thicknesses of portions thereof in the individual sub-pixel regions S increase sequentially in accordance with the increases in the areas of the transmissive display regions T in the sub-pixel regions S. Therefore, the total thickness of the color filter layer 22 and the overcoat film 24 can be made substantially uniform for all the sub-pixel regions S. This contributes to realizing a uniform retardation amount of the liquid crystal layer 13 for all the sub-pixel regions S in the transmissive display mode. Thus, high-quality image display can be realized. Similar effects and advantages can also be produced by forming the color filter layer 22 such that the thicknesses of portions thereof in the individual sub-pixel regions S increase sequentially in accordance with the decreases in the shorter-side lengths of the openings 23R, 23G, and 23B. Specifically, when the area of the transmissive display region T in one of two sub-pixel regions S (a first sub-pixel region S) is set to 1.25 or more times that of the transmissive display region T in the other sub-pixel region S (a second sub-pixel region S), the thickness of the colored layer 22R, 22G, or 22B in the second sub-pixel region S is set to 1.05 or more times that in the first sub-pixel region S. Thus, the liquid crystal layer 13 can more assuredly have a uniform thickness for all the sub-pixel regions S.

Second Embodiment

Figure 3A:
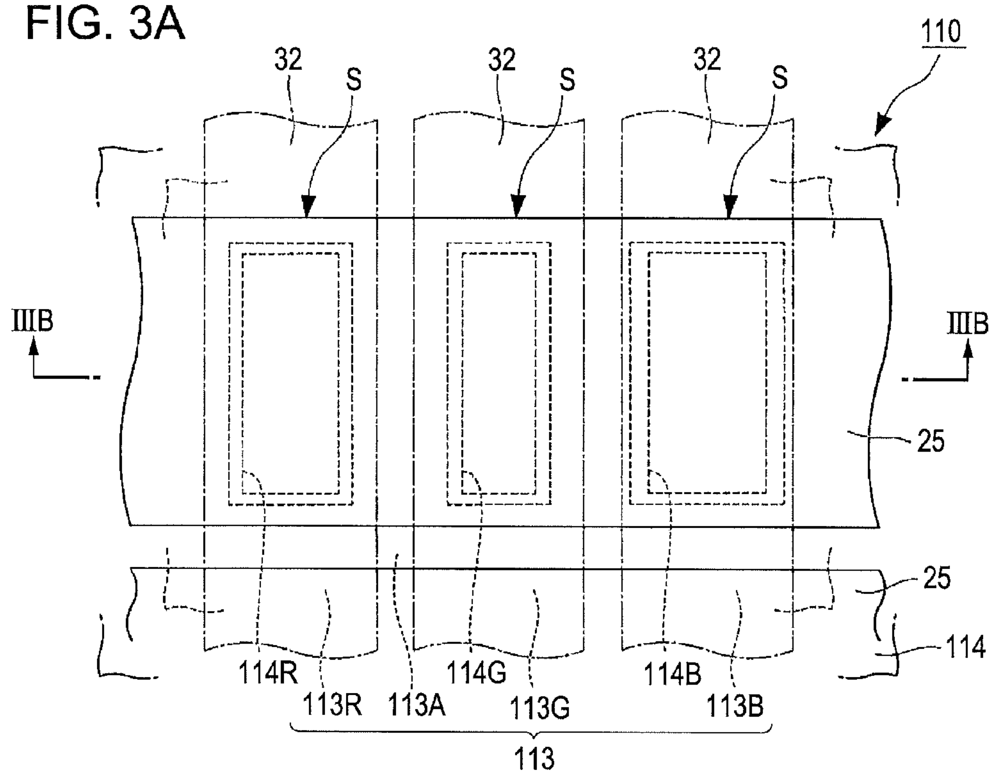
FIG. 3A is a plan view showing a pixel of a liquid crystal apparatus according to a second embodiment of the invention.
Figure 3B:
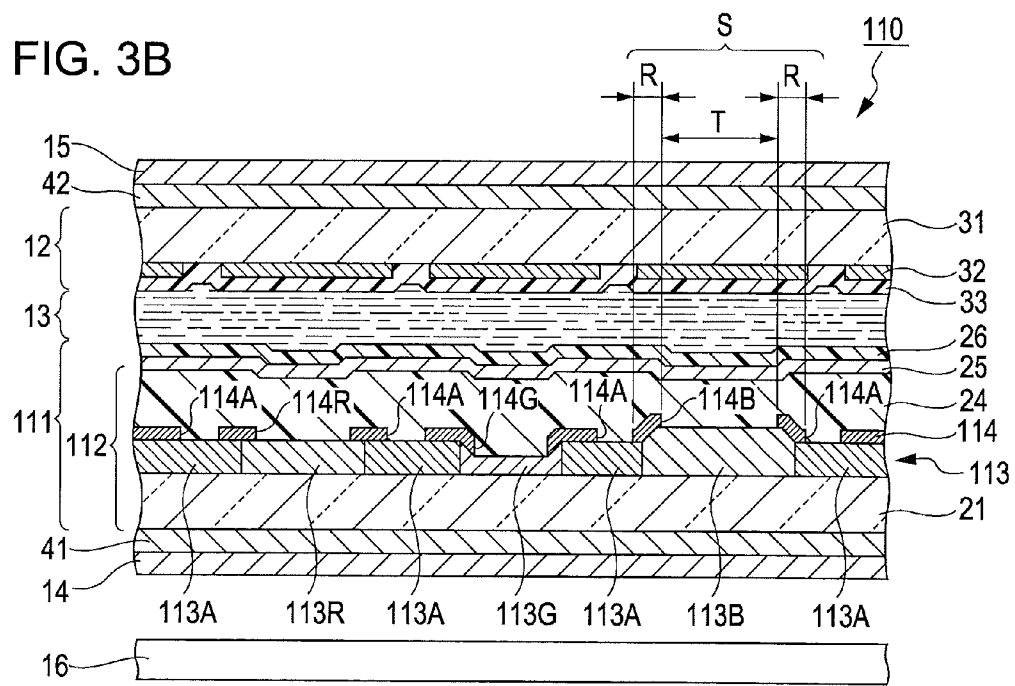
FIG. 3B is a cross-sectional view showing the pixel of the liquid crystal apparatus according to the second embodiment of the invention.

Next, a liquid crystal apparatus and a color filter substrate according to a second embodiment of the invention will be described with reference to the drawings. FIGS. 3A and 3B show a pixel of the liquid crystal apparatus in a plan view and in a cross-sectional view taken along line IIIB-IIIB in FIG. 3A, respectively. However, slits are not shown in FIG. 3A. Since the second embodiment differs from the first embodiment in the configuration of the color filter substrate, the second embodiment will be described focusing on the difference in the color filter substrate. Other elements already described in the first embodiment will be denoted by the same reference numerals as in the first embodiment, and descriptions thereof will be omitted.

Referring to FIGS. 3A and 3B, a liquid crystal apparatus 110 in the second embodiment includes light-shielding layers 113A incorporated in a color filter layer 113 included in a color filter substrate 112 in a lower substrate 111.

In other words, the color filter layer 113 includes the light-shielding layers 113A extending along the outer peripheries of the sub-pixel regions S, and also includes colored layers 113R, 113G, and 113B.

The light-shielding layers 113A form substantially a matrix in plan view and extend between and overlap the peripheries of the sub-pixel regions S. In other words, the light-shielding layers 113A extend between and overlap the peripheries of regions where the common electrodes 25 and the segment electrodes 32 overlap each other in plan view. The thicknesses of the light-shielding layers 113A are substantially equal to that of the colored layer 113R, which has a medium thickness among the colored layers 113R, 113G, and 113B. This contributes to realizing an improved flatness of the surface of the overcoat film 24.

The colored layers 113R, 113G, and 113B are provided in regions separated from one another by the light-shielding layers 113A forming a matrix and have substantially rectangular shapes in plan view.

The color filter layer 113 is formed by applying a resin material for forming, for example, the light-shielding layers 113A on the substrate body 21, patterning the resin material by photolithography or the like to form the light-shielding layers 113A, and repeating similar processes for the colored layers 113G, 113R, and 113B.

A reflective film 114 includes openings 114R, 114G, and 114B provided in positions thereon corresponding to the transmissive display regions T, and slits 114A provided along the outer peripheries of the sub-pixel regions S to be shaped into a matrix in plan view. The light-shielding layers 113A are partially exposed through the slits 114A at outer peripheries of the sub-pixel regions S to be in contact with the overcoat film 24. Therefore, light incident through the upper substrate 12 and traveling through the liquid crystal layer 13 toward the boundaries between the sub-pixel regions S further travels through the slits 114A in the reflective film 114 and is absorbed by the light-shielding layers 113A.

The liquid crystal apparatus 110 and the color filter substrate 112 in the second embodiment also produce similar effects and advantages as in the first embodiment. Further, the provision of the light-shielding layers 113A contributes to realizing an improvement of the contrast in the reflective display mode, leading to high-quality image display. In the second embodiment, the light-shielding layers 113A overlap the inner peripheries of the sub-pixel regions S. This improves the flatness in the reflective display regions R, and therefore the amounts of retardation in the liquid crystal layer 13 can be made uniform. Thus, higher-quality image display can be realized.

Now, the liquid crystal apparatus and the color filter substrate according to the embodiments of the invention will be described with more specific examples.

Tables 1 to 3 show the dimensions of each opening, the thickness of each colored layer, and the thickness of the liquid crystal layer in the sub-pixel regions for R, G, and B. Tables 1, 2, and 3 respectively show such values for liquid crystal apparatuses of a first example, a second example, and a comparative example. Each opening has a rectangular shape in plan view, whose shorter-side length, longer-side length, and area are represented by W, L, S, respectively. The thickness of each colored layer and the thickness of the liquid crystal layer are represented by C and d, respectively. Further, S/Sg and C/Cg represent the ratio of the area of each opening when the area of the opening in the sub-pixel region for G is defined as 1, and the ratio of the thickness of each colored layer when the thickness of the colored layer in the sub-pixel region for G is defined as 1, respectively.

TABLE 1

| First example | W (μm) | L (μm) | S (μm²) | C (μm) | d (μm) | S/Sg | C/Cg |
|---|---|---|---|---|---|---|---|
| R | 44 | 200 | 8800 | 1.12 | 5.55 | 1.26 | 1.06 |
| G | 35 | 200 | 7000 | 1.06 | 5.54 | 1.00 | 1.00 |
| B | 48 | 200 | 9600 | 1.19 | 5.55 | 1.37 | 1.12 |

TABLE 2

| Second example | W (μm) | L (μm) | S (μm²) | C (μm) | d (μm) | S/Sg | C/Cg |
|---|---|---|---|---|---|---|---|
| R | 45 | 100 | 4500 | 1.14 | 5.55 | 1.41 | 1.10 |
| G | 32 | 100 | 3200 | 1.04 | 5.56 | 1.00 | 1.00 |
| B | 50 | 100 | 5000 | 1.21 | 5.55 | 1.56 | 1.16 |

TABLE 3

| Comparative example | W (μm) | L (μm) | S (μm²) | C (μm) | d (μm) | S/Sg | C/Cg |
|---|---|---|---|---|---|---|---|
| R | 44 | 200 | 8800 | 1.12 | 5.53 | 1.26 | 1.02 |
| G | 35 | 200 | 7000 | 1.10 | 5.49 | 1.00 | 1.00 |
| B | 48 | 200 | 9600 | 1.09 | 5.66 | 1.37 | 0.99 |

As is understood from Tables 1 to 3, it was found that the liquid crystal layer could be formed with a substantially uniform thickness for all the sub-pixel regions by sequentially increasing the thicknesses of the colored layers in accordance with the increases in the areas or shorter-side lengths of the openings. It was also found that the liquid crystal layer could be formed with a substantially uniform thickness by setting the areas of the openings in the sub-pixel regions for R and B to 1.25 or more times that in the sub-pixel region for G, while setting the thicknesses of the colored layers in the sub-pixel regions for R and B to 1.05 or more times that in the sub-pixel region for G.

Table 4 shows the contrast in the transmissive display mode and the perceived colors in white display and in black display for each of the first example and the comparative example shown in Tables 1 and 3.

TABLE 4

| | Contrast | White display | Black display |
|---|---|---|---|
| First example | 44 | Whitish | Blackish |
| Comparative example | 35 | Yellowish | Bluish |

As shown in Table 4, it was confirmed that the uniformity in the thickness of the liquid crystal layer improved the contrast in the transmissive display mode and the perceived colors in white display and in black display.

The invention is not limited to the above-described embodiments, and various modifications can be made thereto within the scope of the invention.

For example, in the embodiments, each sub-pixel region includes a single opening, i.e., a single transmissive display region. However, each sub-pixel region may also include a plurality of openings. In that case, the thickness of each colored layer is determined with reference to the largest one of the transmissive display regions defined by the corresponding openings.

In the embodiments, the thicknesses of the colored layers are sequentially increased in accordance with the increases in the areas of the transmissive display regions in the three sub-pixel regions for R, G, and B. However, among at least two of a plurality of sub-pixel regions included in a single pixel, one sub-pixel region may only need to have a transmissive display region larger than those in the other sub-pixel regions and a colored layer thicker than those in the other sub-pixel regions. Likewise, in the embodiments where the transmissive display regions have rectangular shapes in plan view, the thicknesses of the colored layers sequentially increase in accordance with the increases in the shorter-side lengths of the transmissive display regions. However, among at least two of a plurality of sub-pixel regions included in a single pixel, one sub-pixel region may only need to have a shorter-side length larger than those in the other sub-pixel regions and a colored layer thicker than those in the other sub-pixel regions.

In the embodiments, the thicknesses of the colored layers sequentially increase in accordance with the increases in the areas of the transmissive display regions in the three sub-pixel regions for R, G, and B. However, as long as the transmissive display regions have rectangular shapes in plan view and the thicknesses of the colored layers sequentially increase in accordance with the increases in the shorter-side lengths of the transmissive display regions, the thicknesses of the colored layers may also sequentially decrease in accordance with the increases in the areas of the transmissive display regions.

Further, openings of adjacent sub-pixel regions may also be provided continuously.

The openings may not necessarily have rectangular shapes in plan view, but may also have circular shapes or the like.

In the embodiments, the areas of the transmissive display regions in the sub-pixel regions for R and B are set to 1.25 or more times that in the sub-pixel region for G while the thicknesses of the colored layers in the sub-pixel regions for R and B are set to 1.05 or more times that in the sub-pixel region for G. However, as long as the liquid crystal layer can have a uniform thickness in all the sub-pixel regions, any other value may also be set.

In the second embodiment, the light-shielding layer may also be provided almost over the entirety of the area below the bottom surface of the reflective film. In this manner, the flatness in the reflective display regions in the sub-pixel regions can be improved. Consequently, display quality in the reflective display mode is also improved.

Further, the liquid crystal apparatus may not necessarily be of the passive-matrix type, but may also be of the active-matrix type.

The liquid crystal apparatus may not necessarily display images in three colors of R, G, and B, but may also display images in two or four or more colors.

Additionally, the electronic apparatus may not necessarily be a mobile phone as in the embodiments as long as it includes the liquid crystal apparatus. Other examples of the electronic apparatus include electronic books, personal computers, digital still cameras, liquid crystal televisions, view-finder-type or monitor-direct-view-type videotape recorders, car navigation systems, pagers, personal digital assistants, calculators, word processors, workstations, videophones, point-of-sale (POS) terminals, and image display apparatuses including touch panels.

What is claimed is:

1. A liquid crystal apparatus comprising: a pair of substrates including a liquid crystal layer disposed therebetween, and a two-dimensional array of pixel regions each including a transmissive display region and a reflective display region, the transmissive display regions of different pixel regions having areas different from one another, wherein one of the substrates has a plurality of color filter layers provided in correspondence with the pixel regions, a reflective film provided over the color filter layers, and an overcoat film covering the reflective film, and wherein, among the pixel regions including the transmissive display regions having different areas, a pixel region including a transmissive display region with a large area has a color filter layer with a thickness larger than that of a color filter layer provided in a pixel region including a transmissive display region with a small area, and wherein when the area of the transmissive display region having a large area is 1.25 or more times larger than the area of the transmissive display region having a small area, the thickness of the color filter layer provided in the pixel region including the transmissive display region having a large area is 1.05 or more times the thickness of the color filter layer provided in the pixel region including the transmissive display region having a small area.

2. A liquid crystal apparatus comprising: a pair of substrates including a liquid crystal layer disposed therebetween, and a two-dimensional array of pixel regions each including a transmissive display region having a rectangular shape in plan view and a reflective display region, the rectangular transmissive display regions of different pixel regions having short-side lengths different from one another, wherein one of the substrates has a plurality of color filter layers provided in correspondence with the pixel regions, a reflective film provided over the color filter layers, and an overcoat film covering the reflective film, and wherein, among the pixel regions including the rectangular transmissive display regions having different short-side lengths, a pixel region including a transmissive display region having a large short-side length has a color filter layer with a thickness larger than that of a color filter layer provided in a pixel region including a transmissive display region having a small short-side length.

3. The liquid crystal apparatus according to claim 1, wherein the transmissive display regions are defined by openings provided in the reflective film.

4. The liquid crystal apparatus according to claim 1, wherein the color filter layers are provided with light-shielding layers extending along outer peripheries of the pixel regions, and wherein the reflective film includes slits provided along outer peripheries of the pixel regions.

5. The liquid crystal apparatus according to claim 4, wherein the light-shielding layers overlap inner peripheries of the pixel regions.

6. A color filter substrate comprising: a substrate body; a plurality of color filter layers provided on the substrate body; a reflective film provided over the color filter layers; and an overcoat film covering the reflective film, wherein the color filter substrate has a two-dimensional array of unit regions each including a reflective display region where the reflective film exists and a transmissive display region where the reflective film does not exist, the transmissive display regions having rectangular shapes in plan view with short-side lengths different from one another in different unit regions, and wherein, among the unit regions including the rectangular transmissive display regions having different short-side lengths, a unit region including a transmissive display region having a large short-side length has a color filter layer with a thickness larger than that of a color filter layer provided in a unit region including a transmissive display region having a small short-side length.

7. An electronic apparatus comprising the liquid crystal apparatus according to claim 1.

* * * * *